United States Patent [19]

Miller et al.

[11] Patent Number: 4,672,087

[45] Date of Patent: * Jun. 9, 1987

[54] PLASTICIZED POLYVINYL ALCOHOL COMPOSITIONS, FORMING PROCESS AND FORMED ARTICLES

[76] Inventors: Gerald W. Miller, 2165 Cable Car Ct., Cincinnati, Ohio 45244; H. Harald Lutzmann, 2241 Briarwood Rd., Cleveland, Ohio 44118

[*] Notice: The portion of the term of this patent subsequent to Aug. 20, 2002 has been disclaimed.

[21] Appl. No.: 716,226

[22] Filed: Mar. 25, 1985

Related U.S. Application Data

[63] Continuation-in-part of Ser. No. 382,481, May 27, 1982, abandoned.

[51] Int. Cl.$^4$ .............................................. C08K 5/52
[52] U.S. Cl. ................................................... 524/141
[58] Field of Search ............... 524/141, 142, 143, 168, 524/169, 230, 557

[56] References Cited

U.S. PATENT DOCUMENTS

| | | | |
|---|---|---|---|
| 3,257,348 | 6/1966 | Epes | 524/557 |
| 3,287,313 | 11/1966 | Imoto | 524/557 |
| 3,585,177 | 6/1971 | Gardner | 260/87.3 |
| 3,997,489 | 12/1976 | Coker | 524/557 |
| 4,254,169 | 3/1981 | Schroeder | 428/35 |
| 4,536,532 | 8/1985 | Miller | 524/230 |

*Primary Examiner*—Paul R. Michl
*Attorney, Agent, or Firm*—John F. Jones

[57] ABSTRACT

Formed articles made from polyvinyl alcohol having an oxygen permeability of no more than about 1 cc mil/100 in$^2$ 24 hr atm. at 80% relative humidity, compositions suitable for use in manufacturing such articles and a process for manufacturing such articles by forming polyvinyl alcohol containing a non-hydroxyl plasticizer in a substantially water-free condition and cooling at a rate sufficiently slow to provide the enhanced impermeability, are disclosed.

11 Claims, No Drawings

PLASTICIZED POLYVINYL ALCOHOL COMPOSITIONS, FORMING PROCESS AND FORMED ARTICLES

RELATION TO OTHER APPLICATIONS

This application is a continuation-in-part of Ser. No. 382,481, filed May 27, 1982 by Gerald W. Miller and H. Harald Lutzmann and now abandoned.

BACKGROUND OF INVENTION

This invention pertains to the art of packaging materials, with particular reference to packaging films. More specifically, it relates to synthetic polymer packaging materials made of polyvinyl alcohol used to package materials which are sensitive to oxygen and water vapor.

Currently available synthetic polymers which are used for packaging food stuffs, medicines and related substances, have a substantial rate of oxygen permeability and water vapor transmission so that the foods and medicines packaged in these materials suffer substantial degradation, thereby losing their taste, potency or customer appeal.

Of the various polymer systems which have been considered as barrier packaging materials, polyvinyl alcohol ranks among the best. Polyvinyl alcohol forms tough clear films which are known for their abrasion resistance and high tensile strength. The oxygen barrier quality of polyvinyl alcohol is superior to all other polymers; however, this quality has been subject to severe degradation at high humidities. Polyvinyl alcohols presently known show a rapid loss of gas barrier performance above 50% relative humidity. In addition, these polyvinyl alcohols demonstrate significantly poorer barrier properties below the 95% hydrolysis level.

In general, the use of one polymer in an extruded film does not provide sufficiently long package life to materials susceptible to oxygen deterioration, and multiple-ply films have been developed for these uses. These multiple-ply products are made by post-lamination or co-extrusion near melt temperatures of a number of different types of polymeric materials to provide optimum life to pre-packaged goods sensitive to oxygen deterioration. It has been conventional to laminate a polyvinyl alcohol core between two outer layers of other polymers which provide a structural support for the polyvinyl alcohol core which provides the gas barrier properties.

The literature indicates that films of polyvinyl alcohol (PVOH) have usually been produced from aqueous solutions or in the presence of some water in conjunction with plasticizers. Conventional technology recognized high-boiling, water-soluble organic compounds containing hydroxyl groups as the most effective plasticizers for polyvinyl alcohol (see, e.g. Kirk-Othmer, Encycl. of Chemical Technology, 3d ed., 1983, vol. 23, p. 854). Glycerine and various glycols are the most widely used plasticizers. Glycerine has frequently been used with water, and water/plasticizer mixes were the most common methods for preparing films and formed objects even after the work of Takigawa which resulted in U.S. Pat. No. 3,607,812 in 1971, when he used glycerine in the absence of water. Even in texts published at a later date, practical methods of fabrication involving PVOH invariably use water as a component in addition to the plasticizer in forming extruded products.

Melt processing additives have been used with PVOH to facilitate extrusion because extrusion of PVOH into a usable form is impossible as a dried powder. This inability to extrude arises from the melt temperature of PVOH being very close to its decomposition temperature, with the rate of decomposition being time and temperature dependent. It will decompose at the melting temperature of about 232° C., if exposed to this temperature for a short period of time. PVOH will also decompose at lower temperatures when left for significantly longer times, even at temperatures as low as 180° C.

It is common in the art to provide additives to decrease the melt temperature of the PVOH system thereby avoiding or minimizing rapid decomposition. It is also known that a PVOH which contains over 5% unhydrolyzed polyvinyl acetate, or which contains a hydroxyl containing plasticizer, will melt at a lower temperature. Thus, the melting temperature of PVOH homopolymer is 232°–235° C. while the melting temperature of a PVOH copolymer containing 12% unhydrolyzed polyvinyl acetate is 195° C. The addition of about 10% glycerine, a hydroxyl containing plasticizer, to either the homopolymer or the copolymer lowers the melting temperature 7° to 10° C. This is one reason why glycerine and various glycols are the most widely used plasticizers.

Formed products are presently fabricated using water or a water/plasticizer combination so as to decrease the melt temperature of the PVOH and thereby avoid or minimize rapid decomposition. Homopolymers of PVOH, copolymers with methyl methacrylate (up to 6%), and copolymers with vinyl acetate (up to 15%) have been extruded with water/plasticizer mixtures by removing the water prior to the polymer leaving the die as a melt or by using a special extrusion technique.

PVOH is prepared by the hydrolysis of polyvinyl acetate (PVAc). Until the early 1970's, the term "polyvinyl alcohol" was used in the literature to describe both partially hydrolyzed PVAc and PVAc which has been substantially fully hydrolyzed to PVOH. It is now conventional to describe materials which are at least 95% hydrolyzed as PVOH homopolymer and those which are less than 95% hydrolyzed as PVOH/PVAc copolymer.

Since the homopolymer and the copolymer are not equivalent in all their properties, and in particular, demonstrate different water solubilities at ambient temperatures and different permeabilities to gases such as oxygen and carbon dioxide, early references to PVOH may be misleading. It is important to identify the degree of hydrolysis of the material. Homopolymer and copolymer cannot be treated as being equivalent.

Exemplary of the many water containing polyvinyl alcohol compositions is Pockel, U.S. Pat. No. 2,963,461, (Dec. 6, 1960) who discloses a novel hydroxyl containing plasticizer for polyvinyl alcohol. Primarily interested in cast polyvinyl alcohol in which water is added to the polyvinyl alcohol system, Pockel also discloses extrusion of polyvinyl alcohol in systems where no water is added to the polyvinyl alcohol/hydroxyl-containing plasticizer system. Depending on the relative humidity of the environment, the highly hygroscopic polyvinyl alcohol used would have contained from about 5% to about 15% water.

The following references exemplify the art relating to the extrusion of PVOH in the absence of water.

The 1965 work, Physics of Plastics, edited by P. D. Ritchie, discloses, at page 350, that polyvinyl alcohol is normally plasticized when used to produce sheet and rod. It further discloses that glycerol (hydroxyl group containing) and p-toluene sulphonamide (non-hydroxyl containing) are suitable plasticizers. No mention is made of drying the composition before extrusion.

The first clear description of a substantially anhydrous (less than 2% water) system does not appear until 1971, in Takigawa et al, U.S. Pat. No. 3,607,812, (Sept. 21, 1971). A conventional polyvinyl alcohol is utilized with a hydrolysis degree of at least 97% and a polymerization degree of 700–1500. The plasticizer is a polyhydric alcohol and the extrusion is done at moisture contents of less than 2%.

Coker, U.S. Pat. No. 3,977,489, (Dec. 14, 1976) discloses combinations of waxes and fatty acid derivatives to aid in the melt flow of polymers such as those disclosed by Takigawa. Coker's melt extrudable PVOH contains:

(1) a hydrocarbon oil or wax, (2) a polyethylene wax or ethylene polymer, and (3) optionally, a plasticizer. Hydroxyl and non-hydroxyl containing plasticizers are disclosed and no reference is made to the presence of water.

Yamata, Japanese Pat. No. 52-65548, (May 31, 1977) discloses a polyvinyl alcohol composition prepared from at least 70% hydrolyzed polyvinyl alcohol having a polymerization degree of between 500 and 3000 and a specified plasticizer, both of which may have been dehydrated before mixing.

Yamata's plasticizer may be non-hydroxyl containing (aromatic sulfonamides) or hydroxyl containing (p-hydroxybenzoic acid esters) and is present in amounts ranging from about 5% to about 67% by weight of the composition. Yamata's plasticizer is claimed to provide a PVOH material which has lessened solubility in water or heated water, lessened volatility during melt molding and lessened sweating (the tendency of the plasticizer to migrate to the surface which then becomes sticky at high temperatures and humidities).

Three of the references discussed above disclose non-hydroxyl containing plasticizers: Physics of Plastics in 1965, Coker in 1976 and Yamata in 1977. In each case, the reference also discloses hydroxyl containing plasticizers and does not distinguish between the two types of plasticizers. These references teach that there is an equivalence between hydroxyl containing and non-hydroxyl containing plasticizers for polyvinyl alcohol and that the two types of plasticizers are interchangeable.

Polyvinyl alcohol has been blended with copolymers to provide properties enhanced for special applications or to solve certain problems. In all cases, these references use conventional polyvinyl alcohols and do not disclose the use of non-hydroxyl containing plasticizers in conjunction with an anhydrous environment to provide enhanced gas barrier properties.

Thus, Schroeder, U.S. Pat. No. 4,254,169, (Mar. 3, 1981) discloses multi-layer films with a core layer of polyvinyl alcohol or ethylene-vinyl alcohol copolymer prepared by conventional means.

European patent publication No. 0,063,006 (Oct. 20, 1983) discloses ethylene-vinyl alcohol copolymer blends and a process for manufacturing films from such copolymers.

It is apparent from the above review of the background of the invention and the state of the art, that completely hydrolyzed polyvinyl alcohols and copolymers of polyvinyl alcohol with polyvinyl acetate and other polymerizable monomers and in particular olefin modified polyvinyl alcohols have outstanding usefulness because of their very low gas transmission rates, at low relative humidities, particularly for gaseous oxygen. It is well known in the packaging art that the principal cause of packaged goods' deterioration with storage age is due to oxidative deterioration. Thus, the art is replete with attempts to produce films and molded articles utilizing polyvinyl alcohol as at least one layer of a packaging material to inhibit oxygen transmission through the packaging material at both low and high relative humidity levels.

These attempts have not been successful. There is today no satisfactory polyvinyl alcohol homopolymer composition which can be formed by conventional techniques and which exhibits a desirable level of impermeability to gases at high relative humidities.

SUMMARY

The present invention overcomes the deficiencies of the prior art by providing polyvinyl alcohol compositions which are easily extrudable and which produce formed articles which have superior properties, including clarity, enhanced gas impermeability at high relative humidities and freedom from pin holes. The formed articles of the present invention are useful as packaging materials which can be used where superior resistance to gases, particularly at high humidities, is required. In addition, the present invention provides a composition which can be melt extruded in a conventional extruder used in processing well known commodity polymers, such as nylon, polyethylene and the like. The extruder can be adapted to the melt forming of the polymeric compositions disclosed by applicants without extensive modification or total replacement of equipment.

In accordance with the present invention, formable polyvinyl alcohol compositions are provided where the polyvinyl alcohol compositions comprise a mixture of
1. a polyvinyl alcohol selected from
   a. polyvinyl alcohol homopolymers; or
   b. blends of polyvinyl alcohol homopolymers and polyvinyl alcohol/$C_{2-4}$ polyolefin copolymers wherein
      1. the polyvinyl alcohol homopolymer is at least 25% by weight of the mixture; and
      2. the polyolefin moiety in the copolymer is not more than about 45% by weight of the copolymer; and
2. a hydroxyl-free organic plasticizer; such plasticizer
   a. being substantially water insoluble;
   b. having a solubility parameter greater than 10 $(cal/cc)^{\frac{1}{2}}$; and
   c. having negligible vapor pressure at forming temperatures.

Polyvinyl alcohol which contains no more than 5% residual polyvinyl acetate is known conventionally and is herein discribed as homopolymer; polyvinyl alcohol with more than 5% polyvinyl acetate or which contains another polymer is conventionally known and is herein described as copolymer.

The plasticizers of the present invention are most easily distinguished from those which are conventionally used in that they must be free of —OH groups. Hydroxyl-free plasticizers have been known in the art for some time but they have always been treated as being functionally equivalent to hydroxyl group containing plasticizers.

It is known that hydroxyl group containing plasticizers depress many of the desirable mechanical properties of the formed article, and in particular, lower the gas barrier properties to a substantial degree at high relative humidity. Surprisingly, we have now discovered that non-hydroxyl group containing plasticizers do not depress the desirable mechanical properties of the formed article to the same extent. Most importantly, the non-hydroxyl group containing plasticizers of the present invention, when used in the process of this invention, provide formed articles with superior gas barrier properties at high relative humidities.

Also provided in accordance with the present invention, is a process for producing polyvinyl alcohol articles of manufacture possessing enhanced gas barrier properties at high humidities. Such process comprises the steps of mixing a polyvinyl alcohol with a non-hydroxyl group containing plasticizer for polyvinyl alcohol, melting the mixture, forming the melted mixture, in substantially water-free conditions, into articles of manufacture and cooling the formed articles. Critical to the practice of this process is a step involving heating the polyvinyl alcohol mixture or the formed article to a temperature of at least 200° C. and then slowly cooling at a rate sufficiently slow to provide an oxygen permeability of no more than 1 cc. mil/100 in$^2$ 24 hrs. atm at 25° C. and 80% relative humidity. The heating/cooling step may be accomplished during mixture melting and forming or it may be accomplished by post-forming heating of the articles of manufacture.

Finally, in accordance with the present invention, there are provided articles of manufacture formed from the disclosed compositions and having the desired oxygen permeability characteristics.

This invention also provides a melt extrudable polymer composition of matter which in its plural forms provides, for example, packaging materials in several forms such as bottles and flexible films which have exceptional resistance to the transmission of gases, particularly oxygen, through the films or walls of such packages.

It is an object of this invention to provide new polyvinyl alcohol packaging materials for foods, medicines and related objects such that the superior gas barrier properties of the polyvinyl alcohol at low humidity levels are substantially maintained at higher humidity levels.

It is another object of this invention to provide new polyvinyl alcohol compositions with enhanced processing characteristics.

It is a further obJect of this invention to provide extruded, multi-layer articles of manufacture which are suitable for use as containers for foods and other oxygen sensitive materials.

It is yet another object of this invention to provide a process for the manufacture of formed polyvinyl alcohol articles having an oxygen permeability at 25° C. and 80% relative humidity of not more than 1 cc mil/100 in$^2$ 24 hr. atm.

DETAILED DESCRIPTION OF THE INVENTION

It has been found that surprising enhancement of the processability of polyvinyl alcohol compositions and of the characteristics of articles manufactured from such compositions can be obtained through the use of the specified polyvinyl alcohols plasticized by non-hydroxyl group containing plasticizers, formed in a substantially water-free environment and cooled below a critical rate.

The polyvinyl alcohols useful in this invention are those selected from
 a. polyvinyl alcohol homopolymers; or
 b. blends of polyvinyl alcohol homopolymers and polyvinyl alcohol/C$_{2-4}$ polyolefin copolymers wherein
  1. the polyvinyl alcohol homopolymer is at least 25% by weight of the mixture; and
  2. the polyolefin moiety in the copolymer is not more than about 45% by weight of the copolymer.

Polyvinyl alcohol homopolymers having a polyvinyl alcohol content in excess of 96% are more effective gas barriers. When the polyvinyl alcohol content is in excess of 98% and most preferably when the polyvinyl alcohol content is 99+%, the most outstanding gas barrier properties are obtained.

A preferred polyvinyl alcohol copolymer is an ethylene-vinyl alcohol copolymer where the olefin moiety is in the range of from about 5% to about 40% of the copolymer.

Ethylene is a preferred olefin since ethylene-vinyl alcohol copolymers are presently commercially available. Other useful members of this class are described in Gardener at al, U.S. Pat. No. 3,585,177 assigned to Monsanto Company, and contain from about 8% to about 35% of a 2-4 carbon atom olefin modification including ethylene, propylene and isobutylene.

Physical admixtures of the polymers described may also be used and are selected using well known criteria for quality and price variations of the ultimate products and their specific uses and articles including co-extruded films, laminates, injection molded articles, blow molded articles, monofilaments and films used alone or as substrates for packaging.

Polyvinyl alcohol polymers generally useful may vary in molecular weights within the range of from about 22,000 to about 150,000 (polymerization degree of from about 500 to about 3500). It is preferred to use polymers having a polymerization degree of from about 700 to about 3400. Polymers of varying molecular weight ranges may be co-blended to modify, regulate and control the melt viscosity and melt temperature. It is convenient to blend polymers with a molecular weight in the range of about 30,000 to about 40,000 with those with a molecular weight of about 70,000 to about 140,000.

The plasticizers useful in this invention are characterized as
 A. substantially water insoluble;
 B. organic;
 C. non-hydroxylated;
 D. having a solubility parameter greater than 10 (cal/cc)$^{1/2}$; and
 E. having negligible vapor pressure at forming temperatures.

We have discovered that these plasticizers do not function in the same manner as conventionally used plasticizers. As discussed above, conventional hydroxyl-group containing plasticizers are chosen, inter alia, for their ability to depress the melt point of the polyvinyl alcohol, generally in the range of 7° to 10° C. Surprisingly, the plasticizers of this invention do not depress the melt point of the polyvinyl alcohol to any great extent.

For reasons not yet fully understood, the plasticizers of the present invention do not depress the mechanical properties of formed articles at high relative humidities to the same extent as hydroxyl group containing plasticizers. Surprisingly, and most importantly, the non-hydroxyl group plasticizer containing compositions enable one, utilizing the disclosed process, to produce articles of manufacture having substantially improved oxygen barrier properties at high relative humidities.

Classes of compounds falling within this group include N-substituted $C_{10-22}$ fatty acid amides; aryl, alkaryl, N-alkaryl aryl, N-aryl alkaryl, N-aryl aryl and N-alkyl alkaryl sulfonamides; aryl and alkaryl phosphates and phosphites; sulfonated alkyl phenols; N-alkyl pyrrolidones; alkylene carbonates and selected admixtures thereof.

Preferred classes include N-substituted $C_{10-22}$ fatty acid amides, alkaryl and N-alkyl alkaryl suldonamides, sulfonated alkyl phenols, N-alkyl pyrrolidones, alkaryl phosphates, alkylene carbonates and selected admixtures thereof.

Specific members of the above classes which are readily available from commercial sources include the following preferred plasticizers: para-toluene sulfonamide, sold under the trademark "Santicizer 9"; a mixture of ortho-and para-isomers of N-ethyl toluene sulfonamide, sold under the trademark "Santicizer 8", both available from Monsanto Company; sulfonated alkyl phenols sold under the trademark "MESAMOLL", available from Mobay Chemical Company; (isopropyl phenyl) di-phenyl phosphate, sold under the trademark "KRONITEX 50", available from FMC Corporation; dimethyl amides of oleic acid, sold under the trademark "HALLCOMID M 18-OL", available from C. P. Hall Company; N-cyclohexyl pyrrolidone, available from GAF Corporation; and ethylene or propylene carbonate, available from the Texaco Company.

In its most preferred embodiment, this invention contemplates the use of a mixture of an N-alkyl alkaryl suldonamide and a sulfonated alkyl phenol as the plasticizer.

The polyvinyl alcohol composition contains from about 4% to about 30% by weight of the composition of the plasticizer. It is preferable to employ from about 5% to about 20% and most preferable to employ from about 7.5% to about 12.5% plasticizer.

The polyvinyl alcohol and plasticizer may be formulated in advance of the forming operation or may be formulated just prior to and directly in commercial forming operations. The polyvinyl alcohol and plasticizer should preferably be substantially water free (less than 2% water) at the time of formulation and most preferably should be anhydrous to minimize post formulation drying procedures. Regardless of the water content at the time of formulation, the mixture must be substantially water free and most preferably anhydrous when the forming operation takes place.

The compositions of the present invention may be formed by any conventional means such as drawing, coining, or impact forming, and it should be understood that the following discussions, describing forming by melt-extrusion, are non-limiting and that the discussion applies, mutatis mutandis, to other forming methods.

The use of the substantially water free compositions of this invention in a readily feedable particulate form is advantageous in melt extrusion, blow molding and injection molding operations. Availability of such forms of the invention would assist in the manufacture of articles as described by Schroeder in U.S. Pat. No. 4,254,169, Mar. 3, 1981, and Ortolani et al in British Pat. No. 1,544,780, without the requirement of proportionate feeding equipment and other equipment essential to pre-blending.

A drying step before melt extrusion is desirable as polyvinyl alcohol in all its forms is hygroscopic, acting as a dessicant for water, and production worthy products may be obtained only on using the dry materials of this invention.

The melt extrusion of the above polyvinyl alcohol polymeric compositions under substantially water free, preferably anhydrous, conditions produces clear, bubble free films characterized by extremely low gas transmission rates, particularly oxygen. Water may be removed from the composition at any time prior to exit from the extrusion die.

Extrusion is accomplished in a conventional manner, in conventional equipment when the composition has been previously dried. The extrusion temperature will be in the range of from about 210° C. to about 250° C., preferably from about 220° C. to about 235° C., and most preferably from about 228° C. to about 233° C.

It is important to the practice of the present invention that the polyvinyl alcohol compositions, having gone through a heat forming step or where the compositions have otherwise been heated to a temperature of above 200° C., are then allowed to cool at a rate sufficiently slow to allow the formation of enhanced gas barrier properties. Most advantageously, the slow cooling step will be accomplished immediately after the heat forming step in which the polyvinyl alcohol composition will have been heated to above 200° C. The slow cooling step may also be accomplished after the formed articles have been otherwise cooled. In this case, the formed articles are quickly heated to about 200° C. and then slowly cooled.

The time necessary for cooling, and the rate of cooling varies with different forming processes, the temperature at which forming took place, the specific PVOH used and the ratio of plasticizer to polymer. In general, it can be said that the enhanced properties will be obtained if the polyvinyl alcohol compositions are allowed to cool without the application of cooling means. Commercially, however, it is desirable to cool the material relatively quickly by application of cooling means to maintain equipment through-put.

In a preferred embodiment of the present invention, the PVOH is formed into a film by a chill roll melt-extrusion process. In this process for extruding plastic film, it is conventional to immediately advance the extruded and still plastic film onto a metal take-off roll which immediately cools the film to the temperature of the roll by absorbing the heat content of the film. This tends to raise the temperature of the roll. The absorbed heat is removed by circulating a cooling means through the rolls at a rate or at a temperature sufficient to maintain the rolls at an elevated temperature.

Unlike the prior art, where the rolls are maintained at a temperature substantially below that of the still plastic extruded material, in the process of the present invention, the rolls are maintained at a temperature just below the point at which the extruded material begins to stick to the roll. This temperature will provide a rate of cooling sufficiently slow to allow maximum gas barrier properties to develop while maintaining acceptable production rates. Once the extruded material has passed over the rolls and solidified, the rate of cooling is not as critical and further cooling to ambient temperatures may be accomplished by any conventional means.

Other cooling means may be used as, for example in blown film extrusion where an air stream flowing across the surface of the formed article is the cooling means. The temperature and flow rate of the air stream are interdependent and are in turn dependent on the shape of the formed article and on the temperature and rate of extrusion.

If the rate of cooling is too fast, the gas barrier properties of the formed article will not be obtained. For example, if the material, having just been extruded at about 230° C. is brought into immediate contact with a roll maintained at 45° C. the rate of cooling is so fast that the desired gas barrier properties will not be achieved. Once the forming process and the specific PVOH compositions within the scope of the present invention have been chosen, it is a simple matter for a skilled artisan to arrive at appropriate processing temperatures and time.

The slow cooling step of this invention will provide articles having an oxygen permeability of 1 cc mil/100 in$^2$ 24 hr. atm or less when used with the polyvinyl alcohol compositions described in this specification. The slow cooling step, used with PVOH compositions outside the scope of the present invention, will not provide the desired gas permeability properties.

Articles manufactured in accordance with this invention will have oxygen permeabilities (in cc. mil/100 in$^2$ 24 hr. atm., at a temperature of 25° C. and at an eighty (80) percent relative humidity) of no greater than about 1. It is preferred to select combinations of polyvinyl alcohols, plasticizers and processing parameters such that the oxygen permeability is less than about 0.5. For many applications, oxygen permeabilities of about 0.25 or below are preferred. Suitable selection of components following the teaching of this disclosure will allow one skilled in the art to achieve a most preferred embodiment where the oxygen permeabilities are about 0.1 or below.

Oxygen permeabilities as used herein are measured on an Ox-Tran instrument supplied by Modern Controls, Inc., Minneapolis, Minn. This instrument consists of a means for securing the test specimen, an oxygen specific coulometric detector, an oxygen injector and bubblers for humidifying gases.

EXAMPLES

The following examples illustrate actual reduction to practice of the invention and establishment of utility thereof.

EXAMPLE 1

One hundred parts by weight of a 99% hydrolyzed polyvinyl alcohol homopolymer having a weight average molecular weight of about 100,000 (Elvanol 71-30) after drying at 160° F. for 16 hours was intermixed with 20 parts of p-toluene sulfonamide (Santicizer 9), 10 parts of a mixture of the ortho and para isomers of N-ethyl toluene sulfonamide (Santicizer 8) and 2 parts of zinc stearate as lubricant. After extensive blending at high shear rate, the mixture was extruded through a ¾" extruder equipped with a three inch slot die and placed immediately after exit onto a roll that was maintained at a temperature just below the temperature where the web would start to adhere to the roll. The extruder had a temperature profile of 150°, 195°, 227° C. from the throat to the metering section with a die temperature of 215° C. Extruded films drawn to a thickness of two mils extruded well, were clear of surface defects and bubbles and indicative of commercially acceptable quality.

EXAMPLE 2

Ninety parts by weight of a fully hydrolyzed polyvinyl alcohol homopolymer, having a molecular weight of about 35,000 (Elvanol 90-50), ten parts by weight of a mixture of the ortho and para isomers of N-ethyl toluene sulfonamide (Santicizer 8), and two parts stearamide were thoroughly mixed and dried for 2.5 hours at 80° C. The mixture was intensively mixed and fed into an extruder with a temperature profile of 150°, 195°, 238° C. from the throat to the metering section and a slot die temperature of 227° C. Films of clear, bubble-free polymer were extruded and cooled as in Example 1. The films were insoluble in cold water. The permeability of this polyvinyl alcohol film measured at 80% relative humidity in a thickness of 2-3 mils was 0.4 cc mil/100 in$^2$ day atm for oxygen.

EXAMPLE 3

The homopolymer powder of Example 2 (Elvanol 90-50) was dried for four hours at 80°-90° C. and an attempt was made to extrude the dried powder under the same conditions as Example 2. The powder would not fuse nor extrude. When eighty-five parts of the homopolymer powder was combined with 15 parts of water, the mixture could be passed through the extruder, but the product could not be formed into a film of quality suitable for use as the product was a mass of foamed polymer. Since the normal equilibrium moisture level of polyvinyl alcohol is near 9%, the amount of 15% was chosen to demonstrate the extrudability. This example indicates the importance of a substantially water free composition.

EXAMPLE 4

Ninety parts of the dried homopolymer powder of Example 2 (Elvanol 90-50) was intensively mixed with reagent grade glycerine, and the mixture was extruded and cooled as in Example 2. A clear film could readily be extruded which had a permeability range to oxygen at 80% relative humidity of 5-10 cc mil/100 in$^2$ day atm.

When three percent water was added to the homopolymerglycerine mixture, and extruded under the same conditions, a film which was clear in color and full of bubbles was extruded, though the film was clearly unacceptable for any commercial film use.

EXAMPLE 5

Ninety parts by weight of the dried homopolymer of Example 2 (Elvanol 90-50) was intermixed with ten parts of a sulfonated alkyl phenol plasticizer (Mesamoll of Mobay Chemical) and two parts of stearamide. After intensive mixing, the dry powder was fed through the extruder and cooled as in Example 2. A near water-white or colorless film was smoothly extruded and drawn to two mil thickness.

EXAMPLE 6

Eighty parts by weight of an 87% to 89% hydrolyzed polyvinyl alcohol copolymer having a molecular weight of about 138,000 (Vinol 523) was plasticized with 18 parts of a mixture of the ortho- and para-isomers of N-ethyl toluene sulfonamide (Santicizer 8). Two parts zinc stearate was included as a lubricant. Clear films were extruded from this mixture and cooled under conditions as in Example 1.

The oxygen permeability was found to be 21 cc mil/100 in.$^2$ 24 hr atm. near 90% relative humidity.

EXAMPLE 7

Ninety parts of an 87 to 89% hydrolyzed copolymer of PVOH/PVA (Vinol 523), ten parts of the dimethyl amide of oleic acid (Hallcomid M18 OL) and two parts zinc stearate were extruded as in Example 2. The polymer could be extruded into a clear film.

EXAMPLE 8

Ninety parts by weight of a preblend consisting of 45 parts of vinyl alcohol homopolymer, having a molecular weight of about 50,000 (Elvanol 90-50), 45 parts by weight of a similar homopolymer having a molecular weight of about 100,000 (Elvanol 71/30) and ten parts by weight of (isopropylphenyl) diphenyl phosphate (Kronitex 50, FMC Corporation) were intensively mixed, extruded and cooled as in Example 2. A smooth film could be extruded with some small bubbling. On regrinding and reextrusion, the material had contact clarity and homogeneity.

EXAMPLE 9

Ninety parts of dried, completely hydrolyzed PVOH homopolymer with a degree of polymerization of about 800 were added to two parts of a sulfonated alkyl phenol (Mesamoll), eight parts of a mixture of the ortho- and para-isomers of N-ethyl toluene sulfonamide (Santicizer 8), one-half part of antioxidant and one part of stearic acid lubricant. The mixture was extruded as in Example 2 between 2 sheets of polyethylene to a thickness of 2 mils. The polyethylene sheets were separated from the extruded PVOH films. The $O_2$ permeability of the PVOH film at room temperature and 80% relative humidity was 0.15 cc mil/100 in$^2$ 24 hr. atm.

EXAMPLE 10

Seventy-five parts by weight of a polyvinyl alcohol made from the combination of 90% polyvinyl alcohol homopolymer (Vinol WS -42) and 10% of a mixture of the ortho- and paraisomers of N-ethyl toluene sulfonamide (Santicizer 8), was mixed with 25 parts of an ethylene-vinyl alcohol copolymer (EVAL-F Kuraray), and the blend was extruded as in Example 1. The film was extruded smoothly and exhibited homogeneity but lacked the degree of transparency that the PVOH without EVAL-F had shown. A similar product could be produced at ratios from 90/10 to 25/75.

Prior to the advent of the compositions herein disclosed, polymer compositions containing major amounts of polyvinyl alcohol homopolymer and minor amounts of ethylene-vinyl alcohol copolymer did not provide homogeneous extrudates. This has been overcome through use of the disclosed plasticizer to render the polyvinyl alcohol extrudable.

Excellent adhesion of the polymer compositions of this invention can be achieved when coextruded with commercial polymers, such as certain modified polyesters, some polyamides and certain modified olefin copolymers (PLEXAR).

Table 1 summarizes the results obtained with regard to the oxygen permeability of selected polyvinyl alcohol films.

TABLE 1

Oxygen Permeability of Selected PVOH Films

| Example No. | Composition PVOH | Plasticizer | Forming Method | Oxygen[1] Permeability |
|---|---|---|---|---|
| — | Homopolymer | No | Cast from Water[2] | 36.0 |
| 6 | 87–89% hydrolyzed 80 parts | N—alkyl toluene sulfonamide 18 parts | Extrusion[3] | 21.0[4] |
| 4 | 99+% hydrolyzed 90 parts | glycerine 10 parts | Extrusion | 5–10 |
| 2 | 99+% hydrolyzed 90 parts | N—alkyl toluene sulfonamide 10 parts | Extrusion | 0.4 |
| 9 | 99+% hydrolyzed 90 parts | N—alkyl toluene sulfonamide 8 parts sulfonated alkyl phenol 2 parts | Extrusion | 0.15 |

[1]Measured on an Ox-Tran instrument at 25° C. and 80% relative humidity.
[2]Prepared from water and cast from solution to a thickness of about 2-3 mils.
[3]Extruded on conventional laboratory extruder equipped with a slot die using single and multiple layer techniques.
[4]At 90% relative humidity.

Table 1 demonstrates the benefits obtained from the present invention.

The first 3 tests utilize prior art compositions and processes for comparison purposes and show that the oxygen permeability of the formed articles is many orders of magnitude greater than that of the compositions and processes of this invention (which are set forth in the last two tests).

The compositions described in this specification, processed in accordance with the procedures described in this specification, provide articles which act as a barrier to oxygen and other gases even under adverse conditions and are well suited to protect food stuffs and medicines from substantial degradation.

We claim;
1. A formed polyvinyl alcohol article of manufacture consisting essentially of a mixture of
   (a) a polyvinyl alcohol homopolymer having a vinyl alcohol content in excess of 95%; or
   (b) a blend of (a) with a polyvinyl alcohol/olefin copolymer wherein the olefin has 2–4 carbon atoms and wherein (a) is at least 25% by weight of the mixture and the olefin moiety in the copolymer is not more than about 45% by weight of the copolymer; with
   (c) from about 4% to about 30% by weight a plasticizer selected from the group consisting of N-substituted fatty acid amides of fatty acids having from 10 to 22 carbon atoms; N-aryl, alkaryl, N-alkaryl aryl, N-aryl alkaryl, N-aryl aryl and N-alkyl alkaryl sulfonamides; aryl and alkaryl phosphates and phosphites; sulfonated alkylphenols; N-alkyl pyroolidones; alkylene carbonates and mixtures thereof,
and having an oxygen permeability of less than about 1 cc/mil/100 square inches/day/atmosphere at 25 degrees C. and 80% relative humidity.

2. The polyvinyl alcohol article of claim 1 in which the polyvinyl alocohol/olefin copolymer is a polyvinyl alcohol/ethylene copolymer.

3. The formed polyvinyl alcohol article of claim 1 in which a plasticizer is selected from the group consisting of N-substituted fatty acid amides, alkaryl and N-alkyl alkaryl sulfonamides, sulfonated alkyl phenols, N-alkyl pyrrolidones, alkaryl phosphates, alkylene carbonates and mixtures thereof.

4. The formed polyvinyl alcohol article of claim 1 in which the plasticizer is a mixture of an N-alkyl alkaryl sulfonamide and a sulfonated alkyl phenol.

5. The formed polyvinyl alcohol article of claim 1 which has an oxygen permeability less than 0.5 cc/mil/100 square inches/day/atmosphere at 25 degrees C. and 80% relative humidity.

6. The formed polyvinyl alcohol article of claim 1 which has an oxygen permeability of less than 0.25 cc/mil/100 square inches/day/atmosphere at 25 degrees C. and 80% relative humidity.

7. The formed polyvinyl alcohol article of claim 1 which has an oxygen permeability of less than 0.1 cc/mill/100 square inches/day/atmosphere at 25 degrees C. and 80% relative humidity.

8. A melt extruded polyvinyl alcohol article of manufacture comprising a plurality of layers wherein at least one layer is composed of polyvinyl alcohol composition consisting essentially of a mixture of
   (a) a polyvinyl alcohol homopolymer having a vinyl alcohol content in excess of 95%; or
   (b) a blend of (a) with a polyvinyl alcohol/olefin copolymer wherein the olefin contains from 2 to 4 carbon atoms and wherein (a) is at least 25% by weight of the mixture and the olefin moiety in the copolymer is not more than about 45% by weight of the copolymer; with
   (c) from about 4% to about 30% by weight a plasticizer selected from the group consisting of N-substituted fatty acid amides in which the fatty acid contains from 10 to 22 carbon atoms; aryl, alkaryl, N-alkaryl aryl, N-aryl alkaryl, N-aryl aryl and N-alkyl alkaryl sulfonamides; aryl and alkaryl phosphates and phosphites; sulfonated alkylphenols; N-alkyl pyrrolidones; alkylene carbonates and mixtures thereof,
and having an oxygen permeability of less than about 1 cc/mil/100 square inches/day/atmosphere at 25 degrees and 80% relative humidity.

9. The melt extruded polyvinyl alcohol of claim 8 in which the plasticizer is a mixture of an N-alkyl alkaryl sulfonamide and a sulfonated alkyl phenol.

10. A melt extruded polyvinyl alcohol article of manufacture comprising a plurality of layers wherein at least one layer is composed of a polyvinyl alcohol composition consisting essentially of a mixture of
    (a) a blend of a polyvinyl alochol homopolymer having a vinyl alcohol content in excess of 95% with a polyvinyl alcohol/olefin copolymer wherein the olefin contains from 2 to 4 carbon atoms and wherein the homopolymer is at least 25% by weight of the blend and the olefin moiety in the copolymer is not more than about 45% by weight of the copolymer; with
    (b) from about 4% to about 30% by weight a plasticizer selected from the group consisting of N-substituted fatty acid amides in which the fatty acid contains from 10 to 22 carbon atoms; aryl, alkaryl, N-alkaryl aryl, N-aryl alkarkyl, N-aryl aryl and N-alkyl alkaryl sulfonamides; aryl and alkaryl phosphates and phosphites; sulfonated alkylphenols; N-alkyl pyrrolidones; alkylene carbonates and mixtures thereof and having an oxygen permeability of less than about 12 cc/mil/100 square inches/day/atmosphere at 25 degrees C. and 80% relative humidity.

11. The melt extruded polyvinyl alcohol article of claim 10 in which the plasticizer is a mixture of an N-alkyl alkaryl sulfonamide and a sulfonated alkyl phenol.

* * * * *